United States Patent [19]
Summers

[11] 3,848,082

[45] Nov. 12, 1974

[54] SYSTEM FOR TRANSMITTING AND UTILIZING SUPPLEMENTAL DATA VIA TELEVISION SYSTEMS

[75] Inventor: George D. Summers, Bethesda, Md.

[73] Assignee: Atlantic Research Corporation, Alexandria, Va.

[22] Filed: Jan. 16, 1973

[21] Appl. No.: 324,166

[52] U.S. Cl. .......................... 178/5.6, 178/DIG. 23

[51] Int. Cl. .......................................... H04n 7/00

[58] Field of Search .......... 178/5.6, DIG. 23, 5.8 R, 178/DIG. 13, 6.8; 179/DIG. 22, DIG. 27, 7.5 R, 15 BV, 15 BY, 15 RA, DIG. 35

[56] References Cited

UNITED STATES PATENTS

| | | | |
|---|---|---|---|
| 3,369,073 | 2/1968 | Scholz | 178/5.6 |
| 3,493,674 | 2/1970 | Houghton | 178/5.6 |
| 3,737,566 | 6/1973 | Baer et al. | 178/DIG. 35 |

*Primary Examiner*—Richard Murray
*Assistant Examiner*—R. John Godfrey

[57] ABSTRACT

A method and apparatus for transmitting and utilizing supplemental data via television signals. A portion of the field of a video signal is replaced with one or more supplemental data signals, and the modified television signal is transmitted by a television transmitter. The modified television signal can be received by a television receiver and displayed on the television screen. The portion of the field which contains the supplemental data signal or signals, which may appear as a visible or invisible dot on the television screen, is monitored by an optical transducer. The output of the optical transducer is applied to an output means which may decode variations in the optical transducer output and apply the decoded signal to a display, such as a visual read-out or printer, or other means for storing or utilizing the signal.

13 Claims, 2 Drawing Figures

SYSTEM FOR TRANSMITTING AND UTILIZING SUPPLEMENTAL DATA VIA TELEVISION SYSTEMS

BACKGROUND OF THE INVENTION

This invention relates to a television system for transmitting and receiving supplemental data (data other than the normal video signal) via a video signal and, more particularly, to such a system in which the supplemental data is inserted into the video signal, transmitted by a conventional television transmitter, and then sensed at the television receiver and displayed, stored or otherwise utilized.

In view of the extension use of television systems throughout the world at the present time, supplemental data transmitted by television broadcasting could be made available to anyone having a television receiver in the home, office or elsewhere. At present, however, a system for transmitting supplemental data via video signals and for displaying, storing and/or utilizing such signals at the receiving station, is not available.

Accordingly, a need has arisen for such a system for transmitting supplemental data via video signals which could be utilized at the receiving end for informational, educational, advertising, reproduction, entertainment or survey purposes, just to name a few. The system of the present invention fulfills this need by providing such a system which is reliable in operation, not excessive in cost and versatile in that it can be used in many different ways for the display, storage and/or other utilization of the supplemental data transmitted.

SUMMARY OF THE INVENTION

The present invention is directed to a method and apparatus for transmitting and utilizing supplemental data by modifying a video signal from a television camera to include a supplemental data signal, sensing the supplemental data signal at the television receiving station, and displaying, storing or otherwise utilizing the supplemental data signal.

In a preferred embodiment, the normal television signal is received from a television camera and applied to a video insertion unit such as a limited-capability special effects generator, while the supplemental data is entered into the system by any conventional data input device, such as a keyboard. The supplemental data signal, which may be in the form of a parallel digital signal, is applied to the video insertion unit through a parallel-to-serial convertor. The serial data, which may consist of a bit stream of logic 1's and logic 0's is mixed with the video signal to produce a modified video signal. The modified video signal has a portion of the field replaced by the supplemental data signal which can be, for example, a spot which is either light or dark depending on whether the supplemental data is at logic 1 or logic 0. The modified video signal is then transmitted via the television transmitter. The transmitter signal is received by a television receiver and the modified video signal is displayed, visibly or invisibly, on the screen of the receiver. The image displayed is the video signal from the television camera with a portion of that signal replaced with the supplemental data signal which may appear as a blinking light indicating logic 1's and logic 0's.

The video insertion unit may include control means for adjusting the size and the position of the portion of the field of the video signal which is occupied by the supplemental data signal.

An optical transducer is positioned adjacent to or remote from the television screen to sense the supplemental data signal in the field of the television signal. The output of the optical transducer is applied to an output means which may include a decoder for decoding the digital supplemental data and a display means for displaying the decoded data. The display means could be a visual read-out device, a printer, or both.

The output means could also include an acceptor device which is adjustable to accept only supplemental data which is preceeded by a particular code. The output means could further include a keyboard coupled to the decoder for entering data at the receiver, the data entered being displayed on the display means. The keyboard could be used, for example, when the supplemental data signal is to be compared with the data entered through the receiver keyboard. In such a case, the display means in the output means could display both the supplemental data and the data entered by the receiver keyboard. The output means could further include a data-comparing device which compares transmitted data with user-input data and which signals an identity or lack-of-identity situation.

DESCRIPTION OF THE PREFERRED EMBODIMENT

Figure 1:
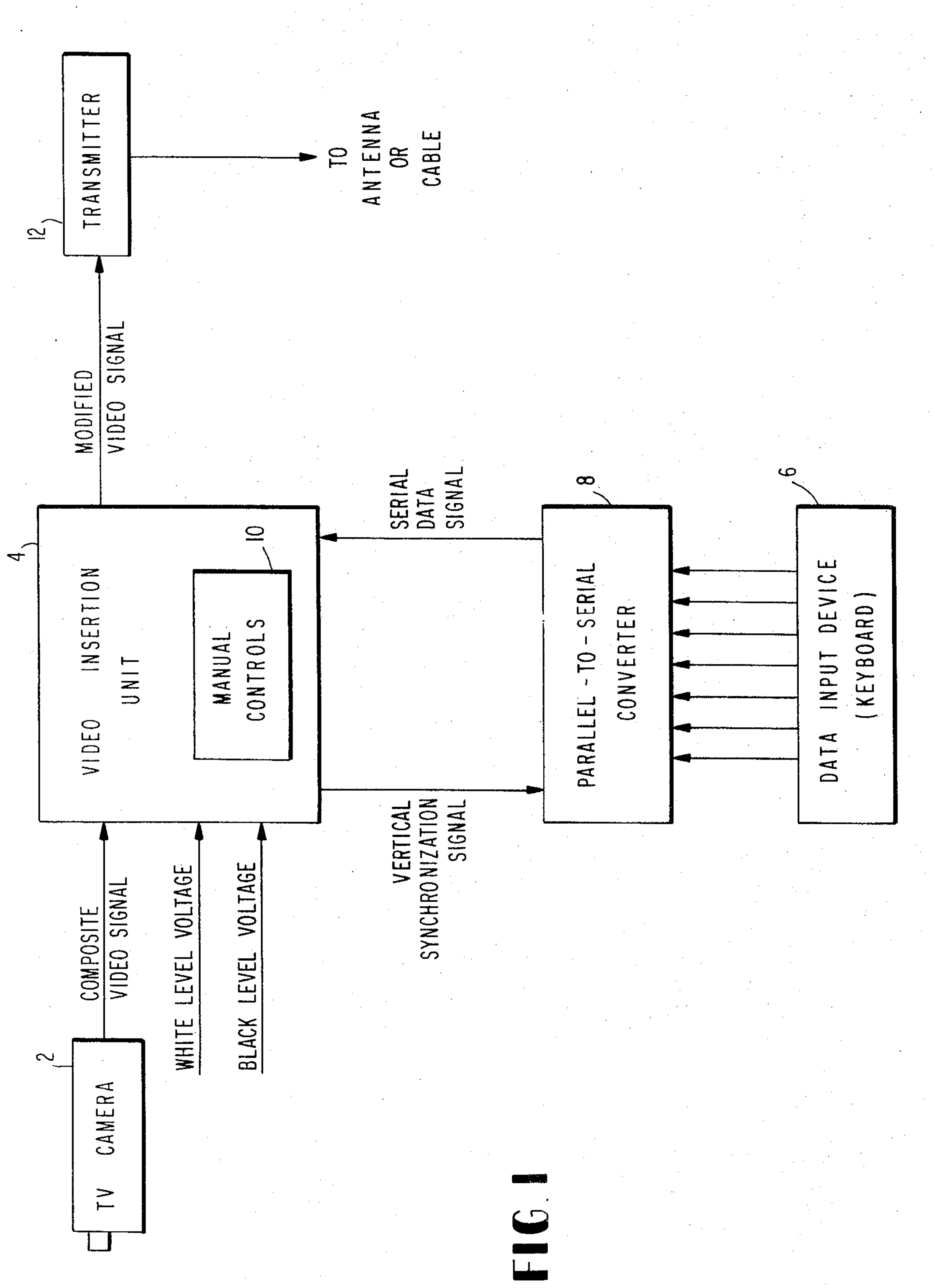
FIG. 1 is a schematic view of the transmitting portion of a supplemental data system constructed in accordance with the principles of the present invention.

Referring to FIG. 1, a television camera 2 of conventional construction produces a video signal in accordance with the image seen by the camera. The video signal is applied to video insertion unit 4 of any suitable or conventional construction. The supplemental data may be entered into the system by any suitable means such as a keyboard 6, which may be a standard commercial type of keyboard providing a digital output in response to the data typed on the keys. A typical example is a keyboard using a code such as USASCII (United States American Standard Code for Information Interchange). In the ASCII system, a seven-digit parallel output is produced in response to each key struck. To enable transmission over a single channel or wire, this data must be converted to serial data prior to applying the supplemental data signal to the video insertion unit 4. It is apparent that any type of input device could be used in lieu of keyboard 6.

The output of the keyboard 6 is applied to a parallel-to-serial converter 8 of any suitable construction which converts the data to serial data and applies it to video insertion unit 4. The vertical synchronization sigal from the video insertion unit is applied to the parallel-to-serial converter 8 in order to provide the necessary synchronization for the converted data.

In the video insertion unit 4, the supplemental data is mixed with the video signal such that it occupies a portion of the field of the video signal. The output of the keyboard 6 may be a two level digital code, and the output of the parallel-to-serial converter may be a series of signals at one of the two logic levels. This type of signal can be used very easily in the video insertion unit to produce a modified video signal having a bright spot corresponding to one logic level and a dark spot corresponding to the other logic level on that portion of the field of the video signal occupied by the supplemental data signal.

As an illustrative example, the video insertion unit 4 may be a limited-capability special effects generator which is capable of creating a "dot" or small area on the video presentation which is free from the normally transmitted video presentation. The video insertion unit 4 may be capable of adjusting the size of the "dot" and its position on the video display. Any of several special-effects generators known in the art can be used for creating and adjusting the "dot." One used in tests at a commercial television station is the Model 540 manufactured by the Reicher Company.

The video insertion unit 4 is also capable of inserting modulated signals in the "dot" area. In tests using the Reicher Model 540 special effects generator, a Central Dynamics Company switcher, model V5100, was used to insert the modulated data.

The video insertion unit 4 may be used also to provide the normally present vertical synchronization signal to the parallel-to-serial converter 8 and to receive the synchronized serial-data signal from the parallel-to-serial converter.

The technique of creating and inserting special displays on a portion of the regular video display by use of a special-effects generators is well known in the television industry. An example of this is a small digital display of time expended or remaining, sometimes placed on a portion of the screen carrying a sporting event.

The video insertion unit 4 may include manual controls 10 of any suitable type which may be used to adjust the size and location of the portion of the field of the video signal which is occupied by the supplemental data signal. If the supplemental data signal is being transmitted with a video signal bearing no relationship to the supplemental data signal, but used merely as the medium for carrying the supplemental data signal, then the supplemental data signal preferably would be located near the edge of the field of the video signal and the dot would be as small as practical. If, on the other hand, the supplemental data signal bears some particular relationship to the video signal, then a selection of the appropriate size and location of the supplemental signal would be made to correspond to the relationship which exists between the video signal and the supplemental data signal.

The modified video signal, which is the normal video signal combined with the supplemental data signal, is applied to a television transmitter 12 of any suitable or conventional construction for transmission to conventional television receivers via an antenna or cable or the like.

Rather than using a video insertion unit, it is possible to feed supplemental data to a suitable supplemental data display (not shown) located in the field of view of the television camera 2. The supplemental data display would comprise one or more modulated video sources, such as an incandescent lamp or light-emitting diode. The television camera would then produce a combined video signal including the normal video signal and the supplemental data signal, which would be transmitted by the television transmitter to the television receiver.

Figure 2:
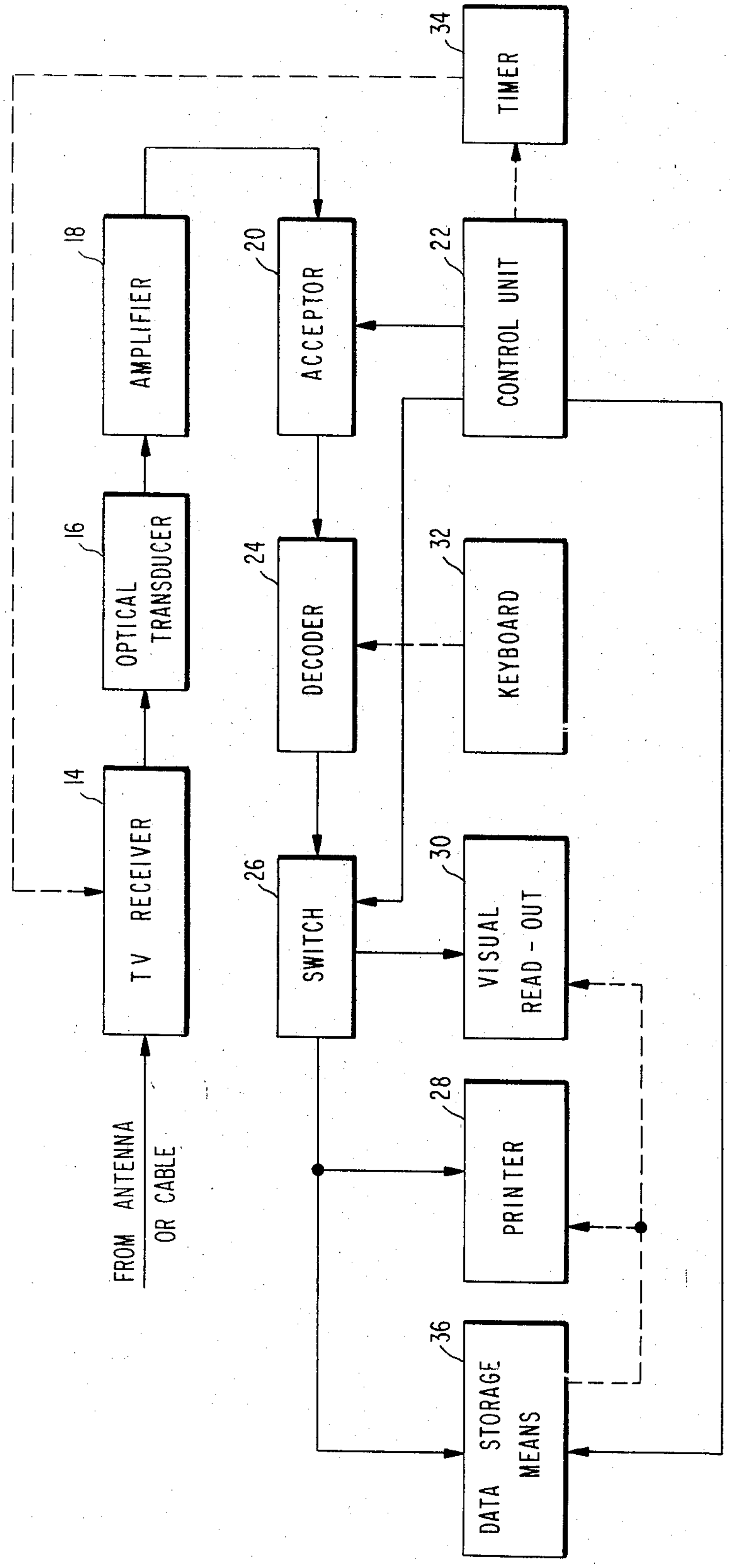
FIG. 2 is a schematic view of the receiving portion of a supplemental data system constructed in accordance with the principles of the present invention.

FIG. 2 illustrates the receiving portion of the television system, comprising a television receiver 14 having a screen and being of any suitable or conventional construction. The supplemental data signal appears as a spot on the television receiver 14 having a pattern of brightness and darkness corresponding to the serial digital data applied to the video insertion unit 4 from the parallel-to-serial converter 8. For practical purposes of implementation it may be desirable to surround the modulated "dot" by an unmodulated zone of black. The reason for this is that there are often small vertical and horizontal motions in the video presentations. When motion is sufficient to permit the regular video scene to come into the field of view of the optical sensor there may be an error introduced into the supplemental data channel. With appropriate sensors and circuitry a white, gray, or other unmodulated buffer zone will suffice. An alternate system is to have the sensor track (follow) the dot as it moves. This system would not require a buffer zone but would require a more expensive light sensor. The alternating pattern of lightness and darkness is detected by an optical transducer 16 of any suitable construction which may be positioned adjacent to or remote from the television screen and is aligned with the portion of the field occupied by the supplemental data signal. As an alternative, an optical fiber device could be used to conduct light from the screen to the optical transducer. The output of the optical transducer 16 may be applied through an amplifier 18 to an acceptor 20 of any suitable or conventional construction. The acceptor 20 is used when it is desired to accept only certain supplemental data signals. For example, assume that the supplemental data transmitted by the transmitter includes both a weather report and news. Each is preceeded by a particular code corresponding to the particular type of supplemental data. By setting the acceptor 20 to receive news, for example, the preceeding code corresponding to news must be received before the acceptor will pass the succeeding supplemental data. Thus, if a weather report is the supplemental data being transmitted, its preceeding code will not affect the acceptor and the succeeding weather report will not pass the acceptor. Acceptors of this type are old and well known in the art and include coincident circuits and registers which compare incoming data with data inserted into the acceptor. The code entered into the acceptor which corresponds to the preceeding code of the desired supplemental data can be changed by means of a manually operable control unit 22 of any suitable or conventional construction so that the viewer may receive only desired supplemental data.

When the acceptor 20 passes the supplemental data, it is applied to a decoder 24 of any suitable or conventional construction which decodes the digital data and converts it to a form suitable for operating a suitable form of display device. The output of the decode may be applied to switch 26 of any suitable construction which is used to select a printer 28 of any suitable construction and/or a visual read-out 30 of any suitable construction, for example, as the display device.

An additional feature of this invention is the use of an input such as a receiver keyboard 32 of any suitable construction which can be used to apply a signal to decoder 24. The signal from keyboard 32, when decoded, may be displayed on printer 28 or visual read-out 30. The keyboard 32 has application when the user may wish to add additional data to the supplemental data signal. For example, if the supplemental data were a question, the keyboard 32 could be used to enter the answer to the question which would then be printed out or displayed after the question. Such a keyboard could also be used to enter the answer to the question so that it could be compared to the correct answer and provide the viewer with an indication of whether or not the chosen answer was correct. This could be accomplished, for example, by transmitting a digital code to the receiving equipment. The viewer, using the keyboard, would insert his choice of code or answer into the system. One or more indicators, such as lamps, buzzers, etc. would be actuated, depending on whether the viewer's chosen code matched the transmitted code.

As a further feature, a timer 34 of any suitable construction can also be included in the system to control the operation of the television receiver 14. In this manner, the control unit 22 can be manually set to control the operation of th timer 34, which, in turn controls the operation of the receiver 14 so that data is transmitted only at times desired by the viewer.

Several techniques are available for reducing the viewer visibility of the supplemental data signal with respect to the normal video signal, without reducing the detection capability. One technique is to employ the "dot" containing the modulated signal for only a portion of the number of changes of frame available. For example, only one frame in six could contain the "dot." The other five frames would show regular video in that space. Viewer ability to see the "dot" would be decreased. However, the modulated signal can still be detected by synchronization of the optical transducer 16. The disadvantage of this technique is that there is a corresponding reduction in the maximum data transmission rate. Another technique is to decrease the size of the portion of the field occupied by the supplemental data signal and, if possible, reduce it to the point of viewer invisibility. The reduction of the size of the portion of the data field becomes a function of the optical or other detector which is used to detect the supplemental data signal. The portion of the field occupied by the supplemental data signal can be made as small as necessary as long as it can be detected by the optical transducer 16. Still another technique is to position the supplemental data portion of the field along the outer periphery of the field where it may be covered by the housing of the television receiver or at a point where it will not be readily noticed by the viewer. The second and third techniques can be utilized with greater data transmission rates than the first technique.

A single supplemental data signal may be utilized to provide a variety of different types of information by use of time-division multiplex (TDM) techniques. For example, news headlines, weather reports and stock market quotations can all be inserted into a single data stream forming the supplemental data signal. Each type of data would be identified by a preceeding coded signal within the stream showing when a particular type of message was starting and when it ended. As hereinbefore described, the acceptor 20 in the receiving portion of the system could be utilized to pass only signals corresponding to the desired type of data.

Another technique for transmitting different types of data in the supplemental data signal is to divide the portion of the field occupied by the supplemental data signal into several sub-parts, each sub-part corresponding to a separate supplemental data signal. The number of sub-parts and their size would be determined by the optical transducers which are used to detect the supplemental data signal. This technique could involve, for example, a photosensitive matrix array containing a large number of cells in a small area. In this manner, a small light spot could contain multiple data streams.

Space diversity, where several sub-parts of the supplemental data signal are used, can be used in order to achieve security in the transmission of supplemental data signals. A single supplemental data signal is broken up into several channels, each channel corresponding to a different sub-part of the supplemental data portion of the field. The data is then transmitted on the various channels corresponding to the different sub-parts in a predetermined psuedo-random sequence. Only receivers knowing the psuedo-random sequence can detect the data on the various channels in their proper sequence and thus properly reconstruct the supplemental data signal. In addition, each channel can be encoded. Decoding would be done at the receiver.

It is apparent that if the number of sub-parts is very large, the normal video signal can be totally replaced with a supplemental data signal having an extremely large number of subparts, each carrying a separate supplemental data signal. The system is thus capable of handling a very large amount of information. This large information-handling capability, coupled with the security capability of the spaced diversity technique, can be used for transmitting such things as mail, magazine subscriptions, etc. from a central location to offices, homes, or other locations having a receiver and the proper code for decoding the signals.

Furthermore, it is apparent that, since the supplemental data signal as it appears on the television screen is not read directly by the viewer, the television screen itself can be eliminated. A receiver which monitors the modified video signal and extracts the desired supplemental data signal directly without going through electrical to visible and visible to electrical interphases is thus possible. The receiver must receive the modified video signal and be capable of recognizing the start of a frame change, the start of each horizontal line sweep, the number of the horizontal line being generated and the position of the sweep in the line. With this information, sampling of the portion of the television signal occupied by the supplemental data signal could be effected electronically and the supplemental data signal extracted, decoded and displayed.

The supplemental data system of the present invention also has application in a participative system. Various types of information can be transmitted as the supplemental data signal. When that information is received, a participant, located at the receiver, can then enter appropriate other data by an input means such as a keyboard at the receiving portion of the system. The supplemental data signal and the information entered in the keyboard at the receiver are then displayed by the display means at the receiver.

A typical situation where the system could be used in a participative manner includes an educational system in which the supplemental data corresponds to questions, and answeres are then entered by a student using the keyboard at his receiver. The display device could include a transmitter for transmitting the student's answer to another location for grading. The student's answer could then be followed by additional supplemental data including the correct answer which would also be displayed on the display means in order to advise the student as to whether or not his answer was correct. The participative mode of operation could also be used in conjunction with advertising in which an advertisement is sent by the supplemental data signal. The advertising could be arranged so that the viewer would have to employ a particular acceptance code or answer certain questions and, if the questions were correctly answered, the viewer would be entitled to some bonus. The bonus could be a coupon print-out of data shown on a display. The viewer would answer the questions by means of an input such as the keyboard at the receiver. This type of advertising, of course, serves to hold the viewer's attention during the course of the advertising.

By proper use of the acceptor 20, the supplemental data signal could be used to notify certain groups of people of the occurrence of some particular event of special importance to them. An example might be the notification of volunteer fireman in the event of a fire. All that is required is that the fireman's television be turned on and his acceptor be set to accept fire signals. Upon the occurrence of a fire, a supplemental data signal, preceeded by a code corresponding to a fire, is transmitted. The preceeding code energizes the decoder at the receiver and the supplemental data could supply the location and extent of the fire.

Other techniques of modulation for the supplemental data signal are also available as well as the bright/dark technique described above. For example, a variation in frequency, amplitude, position or any combination of the above could be used.

The supplemental data signal could also be used to transmit a control signal rather than an informational signal for display. When used as a control signal, the output of the decoder, the optical transducer, or the display of the supplemental data signal on the receiver screen could be used to control the operation of a device responsive to the control signal and located near the receiver or remote from it.

As a practical matter, television screens of various sizes exist in common household television sets. The size of the portion of the field occupied by the supplemental data, therefore, would vary in accorance with the size of the screen. This problem can be overcome by using a lens system in conjunction with the optical transducer for increasing or decreasing the size of the portion of the frame as seen by the optical transducer. The lens system could correspond to the size of the television screen.

The supplemental data signal transmitted and received through the use of the system of the present invention could also be utilized to program a data storage means 36 (FIG. 2) such as a computer at the receiving end for various purposes. In this manner, the supplemental data can be stored and used subsequently if and when desired. Thus, it is not necessary that the data transmitted and received by the present system be viewed or otherwise utilized in real time. As an illustrative example, subsequent use of the data could be at a preselected time, upon sensing of an event or completion of a prior program, or upon user command.

What is claimed is:

1. A system for transmitting and receiving a supplemental data signal with a normal video signal, said system comprising:

a. transmitter means for transmitting said supplemental data signal and said video signal as a modified video signal, said transmitter means comprising:

i. television camera means for producing said normal video signal in accordance with the image in the field of view of said camera means, ii serial data generator means for generating said supplemental data signal in coded form, iii video insertion means connected to said camera means and said data generator means for receiving said ordinary video signal and said coded supplemental data signal and for producing said modified video signal, and iv a transmitter for transmitting said modified video signal; and b receiver means for receiving said modified video signal, said receiver means comprising:

i television receiver means for displaying said modified video signal such that said coded supplemental data signal occupies a portion of the field of said normal video signal, ii optical transducer means for detecting said supplemental data signal;

iii decoding means connected to said optical transducer means for decoding said supplemental data signal, and iv output means coupled to said optical transducer means and said decoding means, for producing an output indicative of said supplemental data signal.

2. The system of claim 1 wherein said supplemental data is digital.

3. The system of claim 2 wherein said data generator means includes keyboard means for entering said supplemental data.

4. The system of claim 3 wherein said data generator further includes parallel-to-serial convertor means connected to said video insertion means and said keyboard means for converting parallel data from said keyboard to serial data for application to said video insertion means.

5. The system of claim 1 wherein said video insertion means includes control means for controlling the size and location of said portion of the field of said video signal occupied by said supplemental data signal.

6. The system of claim 4 wherein the portion of said field of said video signal occupied by said supplemental data signal appears as a spot on said receiver means having a pattern of brightness and darkness corresponding to the serial digital data applied to said video insertion means from said parallel-to-serial convertor means.

7. The system of claim 1 wherein said output means includes display means for receiving said decoded supplemental data signal and for displaying said supplemental data.

8. The system of claim 7 wherein said output means further includes acceptor means for passing said supplemental data signal to said decoding means only when said supplemental data signal includes a predetermined initial code signal.

9. The system of claim 7 wherein said output means includes a keyboard means for supplying additional data to said display means for comparision with said supplemental data, thereby providing a participative system.

10. The system of claim 7 wherein said display means comprise a visual read-out device, a printer, and a switch means for selecting said read-out and/or said printer.

11. The system of claim 8 wherein means are provided to divide said supplemental data signal into a plurality of time division multiplexed channels and to create different predetermined code signals preceding the data in each channel, and wherein said acceptor means includes selector means for selecting a predetermined initial code signal and its corresponding supplemental data for passage to said decoder means and to said display means.

12. The system of claim 8 wherein means are provided to divide said supplemental data signal into a plurality of space diversity channels and to arrange said supplemental data in said channels in a pseudo-random or non pseudo-random sequence.

13. The system of claim 1 wherein said output means comprises means for storing said supplemental data signal for future use.

* * * * *